US010982554B2

(12) United States Patent
Seshadri et al.

(10) Patent No.: US 10,982,554 B2
(45) Date of Patent: Apr. 20, 2021

(54) TIP SHROUD FOR A TURBINE ENGINE

(71) Applicant: General Electric Company, Schenectady, NY (US)

(72) Inventors: Ganesh Seshadri, Bangalore (IN); Pranav Kamat, Bangalore (IN); Mahendran Manoharan, Bangalore (IN); Dhananjaya Gottapu, Bangalore (IN); Ravikanth Avancha, Bangalore (IN)

(73) Assignee: General Electric Company, Schenectady, NY (US)

( * ) Notice: Subject to any disclaimer, the term of this patent is extended or adjusted under 35 U.S.C. 154(b) by 627 days.

(21) Appl. No.: 15/796,494

(22) Filed: Oct. 27, 2017

(65) Prior Publication Data

US 2021/0079795 A1 Mar. 18, 2021

(30) Foreign Application Priority Data

Oct. 28, 2016 (IN) .............................. 201641036997

(51) Int. Cl.
*F01D 5/22* (2006.01)

(52) U.S. Cl.
CPC .................................. *F01D 5/225* (2013.01)

(58) Field of Classification Search
CPC ........................................................ F01D 5/225
USPC ......................................................... 416/195
See application file for complete search history.

(56) References Cited

U.S. PATENT DOCUMENTS

| 8,105,039 | B1* | 1/2012 | El-Aini | F01D 11/008 |
| | | | | 416/195 |
| 2006/0140768 | A1* | 6/2006 | Tam | F01D 5/143 |
| | | | | 416/193 A |
| 2009/0053047 | A1 | 2/2009 | Chiurato et al. | |
| 2009/0180893 | A1* | 7/2009 | Brittingham | F01D 5/186 |
| | | | | 416/97 R |
| 2009/0180894 | A1* | 7/2009 | Brittingham | F01D 5/225 |
| | | | | 416/97 R |

(Continued)

FOREIGN PATENT DOCUMENTS

| CH | 697806 B1 * | 7/2013 |
| DE | 102008044419 A1 * | 2/2009 |

OTHER PUBLICATIONS

Indian Office Action corresponding to in Application No. 201641036997 dated Aug. 1, 2019.

*Primary Examiner* — J. Todd Newton
(74) *Attorney, Agent, or Firm* — McGarry Bair PC

(57) ABSTRACT

A turbine engine with a tip shroud and method for shaping the tip shroud where at least one pair of airfoils including a first and second airfoil each having an outer wall bounding an interior. Each airfoil extending between a pressure side and a suction side to define a circumferential direction and extending between a leading edge and a trailing edge to define an axial direction. Each airfoil extending between a root and a tip to define a radial direction. The first and second airfoils are circumferentially spaced to define an inlet between the leading edges and an outlet between the trailing edges where each airfoil is coupled to an inner platform at the root. A tip shroud circumscribing the airfoil operably coupled to the tip extending in the axial direction between axially spaced first and second planes where the tip shroud includes at least one scalloped portion.

23 Claims, 6 Drawing Sheets

(56) References Cited

U.S. PATENT DOCUMENTS

| | | | |
|---|---|---|---|
| 2009/0180896 A1* | 7/2009 | Brittingham | F01D 5/225 |
| | | | 416/97 R |
| 2009/0304520 A1 | 12/2009 | Brittingham et al. | |
| 2013/0089421 A1* | 4/2013 | Nussbaum | F01D 5/20 |
| | | | 416/1 |
| 2013/0189106 A1* | 7/2013 | Chouhan | F01D 5/225 |
| | | | 416/179 |
| 2015/0345306 A1 | 12/2015 | Chouhan et al. | |
| 2016/0076385 A1* | 3/2016 | Chouhan | F01D 5/143 |
| | | | 416/191 |
| 2017/0175535 A1* | 6/2017 | Chouhan | F01D 5/18 |
| 2017/0175536 A1* | 6/2017 | Jaiswal | F01D 5/147 |
| 2017/0183971 A1* | 6/2017 | McDufford | F01D 5/225 |
| 2018/0010467 A1* | 1/2018 | Zhang | F01D 5/20 |
| 2018/0179900 A1* | 6/2018 | Tham | F01D 5/225 |
| 2018/0179901 A1* | 6/2018 | Martin, Jr. | F01D 5/225 |
| 2018/0202298 A1* | 7/2018 | Zemitis | F01D 5/225 |
| 2018/0209278 A1* | 7/2018 | Taylor | F01D 5/187 |
| 2018/0223674 A1* | 8/2018 | Taylor | F01D 5/186 |

* cited by examiner

US 10,982,554 B2

TIP SHROUD FOR A TURBINE ENGINE

FIELD OF THE INVENTION

Embodiments of the invention relate to tip shroud for a turbine engine and more particularly for gas or combustion turbine engines.

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft comprise multiple compressor stages designed with a plurality of bands of blades rotated by a rotor and bands of static vanes disposed between the blades. The blades can be integrally formed with a tip shroud. Tip shrouds can be scalloped to reduce weight and therefore centrifugal loads on the blades. While scalloping provides a reduction in weight, it can increase aerodynamic loss due to seal leakage flow and losses due to mixing of leakage flow with the main flow of combusted gases.

BRIEF DESCRIPTION OF THE INVENTION

In a first aspect, a turbine engine comprising at least one pair of airfoils comprising a first and second airfoil each having an outer wall bounding an interior extending between a pressure side and a suction side to define a circumferential direction and extending between a leading edge and a trailing edge to define an axial direction and extending between a root and a tip to define a radial direction. The first and second airfoils are circumferentially spaced to define an inlet between the leading edges and an outlet between the trailing edges, a tip shroud circumscribing the airfoil operably coupled to the tip extending in the axial direction between axially spaced first and second planes. A first scalloped portion comprising a fillet line circumferentially spaced from the suction side of the first airfoil connecting a first forward point in the first plane to a rounded corner, and a line connecting the rounded corner to second forward point in the first plane circumferentially spaced from the leading edge on the pressure side of the second airfoil.

In another aspect a turbine assembly for a turbine engine comprising a hub defining a circumferential surface and rotatable about a centerline, at least one pair of blades provided circumferentially about the hub, each blade having a wall bounding an interior and defining a pressure side and a suction side, extending chord-wise from a leading edge to a trailing edge, and radially from a root to a tip, with the root mounted to the circumferential surface. A tip shroud provided circumferentially about the blade tips, a fillet extending between the wall and the tip shroud and a forward edge of the tip shroud at least partially defined by a fillet line on a fillet boundary on the suction side and an edge extending along a line from the fillet on the pressure side that intersects with the fillet boundary, and the scallop line forms an angle between 25 and 60 degrees with respect to a plane perpendicular to the centerline.

In another aspect, a method of shaping a tip shroud with a forward edge and an aft edge and mounted to a first and second airfoil where each airfoil includes a leading edge and a trailing edge, and a circumferential distance between consecutive trailing edges defines a pitch length and a throat distance line extends from the first airfoil to a trailing edge of the second airfoil defining a throat distance. The method comprising forming a fillet line circumferentially spaced from a suction side of the first airfoil and parallel to the camber line of the first airfoil, forming a line circumferentially spaced from a pressure side of the second airfoil and extending towards the suction side of the first airfoil, and connecting the fillet line to the scallop line with a rounded corner at a point circumferentially spaced from the first airfoil at a maximum thickness of the first airfoil to define a first scalloped portion.

DETAILED DESCRIPTION

Figure 1:
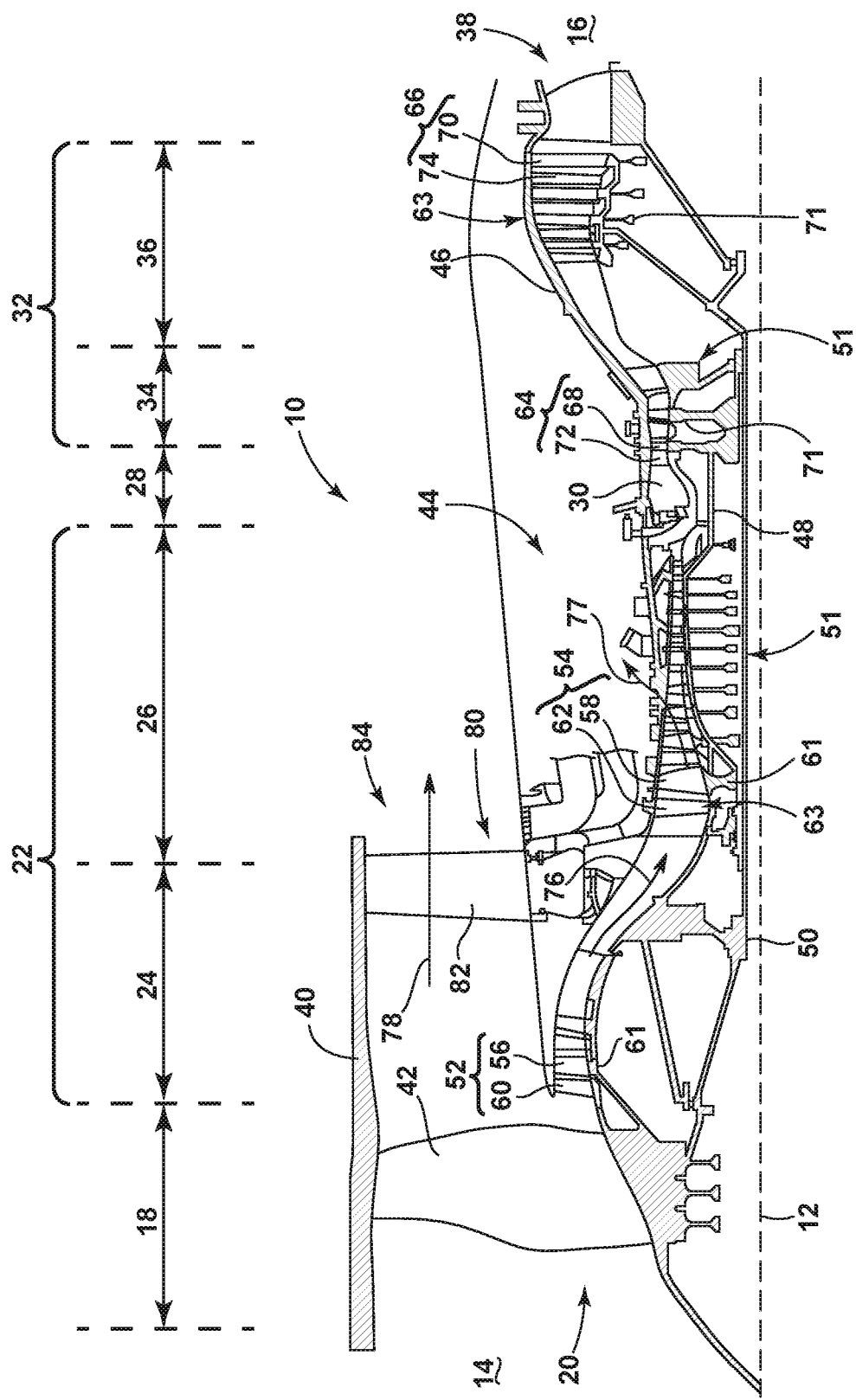
FIG. 1 is a schematic cross-sectional diagram of a turbine engine for an aircraft.

The described embodiments of the present invention are directed a turbine assembly having a pair of blades and a tip shroud where scalloping is done to the tip shroud with an aerodynamic design. For purposes of illustration, embodiments of the present invention will be described with respect to the turbine for an aircraft gas turbine engine. It will be understood, however, that embodiments of the invention are not so limited and can have general applicability in non-aircraft applications, such as other mobile applications and non-mobile industrial, commercial, and residential applications.

As used herein, the terms "axial" or "axially" refer to a dimension along a longitudinal axis of an engine. The term "forward" or "upstream" used in conjunction with "axial" or "axially" refers to moving in a direction toward the engine inlet, or a component being relatively closer to the engine inlet as compared to another component. The term "aft" or "downstream" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
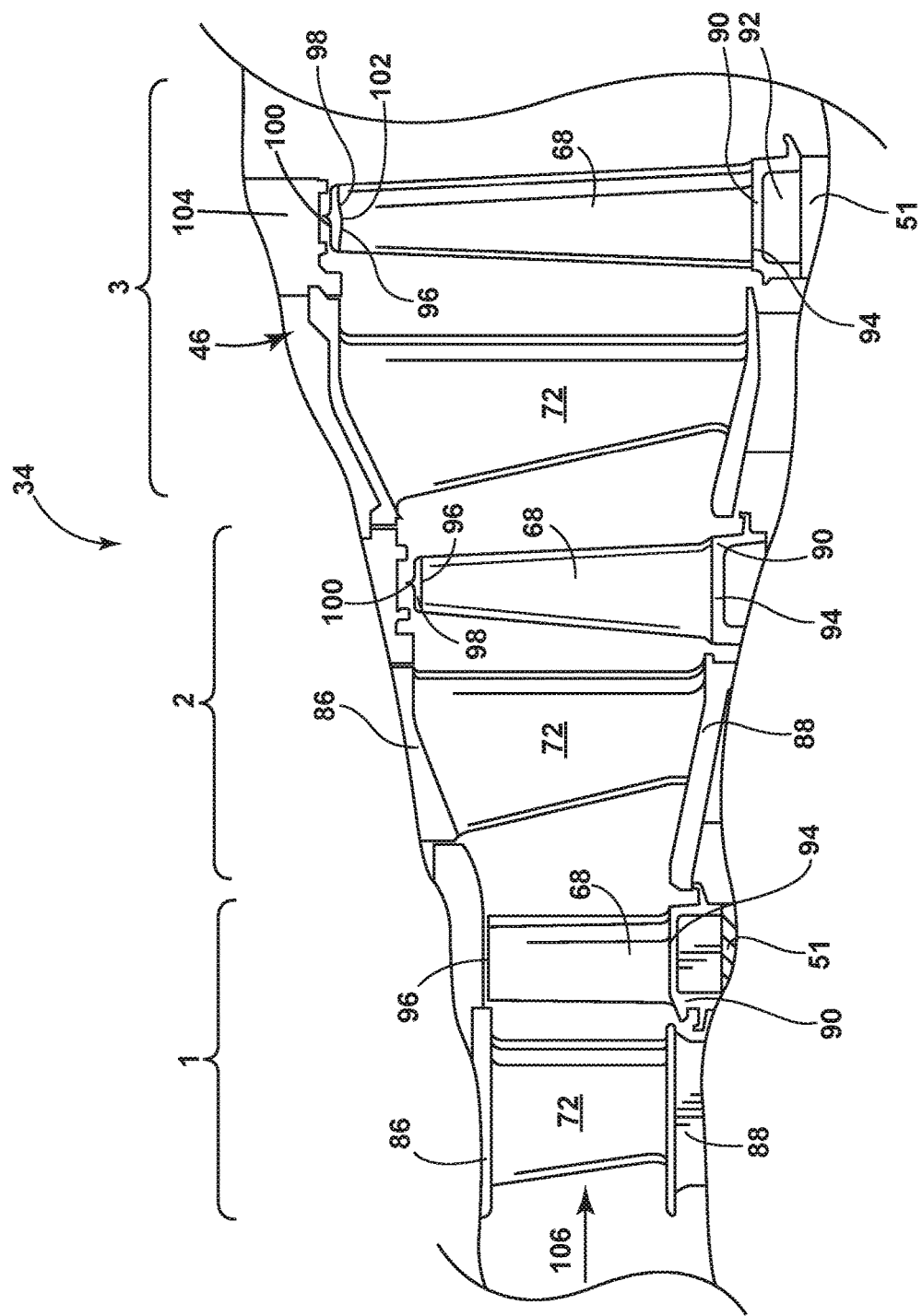
FIG. 2 is a section view of a turbine section of the turbine engine of FIG. 2.

FIG. 2 shows the HP turbine section 34 of FIG. 1 comprising a plurality of turbine blades 68 and turbine vanes 72. While the description herein is written with respect to a turbine, it should be appreciated that the concepts disclosed herein can have equal application to a compressor section and to any other structure with rotating blades and stationary vanes. Each combination of one ring of vanes 72 and one ring of blades 68 can comprise stages 1, 2, and 3.

Each vane 72 mounts at a radially outer band 86 and a radially inner band 88, with the core casing 46 comprising the radially outer band 86. The vanes 72 are radially disposed around the engine centerline 12.

The blades 68 can be provided circumferentially about the rotor 51 comprising an inner platform 90 and a dovetail 92 and mounted to a hub 93. The hub 93 is annular relative to the centerline 12 of the engine 10, such that a plurality of blades 68 can be disposed around the hub 93. The hub 93 can rotate about the centerline 12, such that the blades 68 rotate radially around the centerline 12. Each blade extends in a radial direction between a root 94 and a tip 96. The root 94 is operably coupled to the inner platform 90 and the tip 96 can be coupled to a tip shroud 98.

Some of the blades are further provided with the tip shroud 98 as illustrated in stages 2 and 3. At least one seal rail 100 is provided along a radial outer surface 102 of the tip shroud 98 for sealing with a shroud 104 fixed to the core casing 46. A hot gas path 106 passes through the turbine stages 1, 2, and 3. The at least one seal rail 100 confines the flow of hot gasses to the hot gas path 106 and minimizes leaking.

Figure 3:
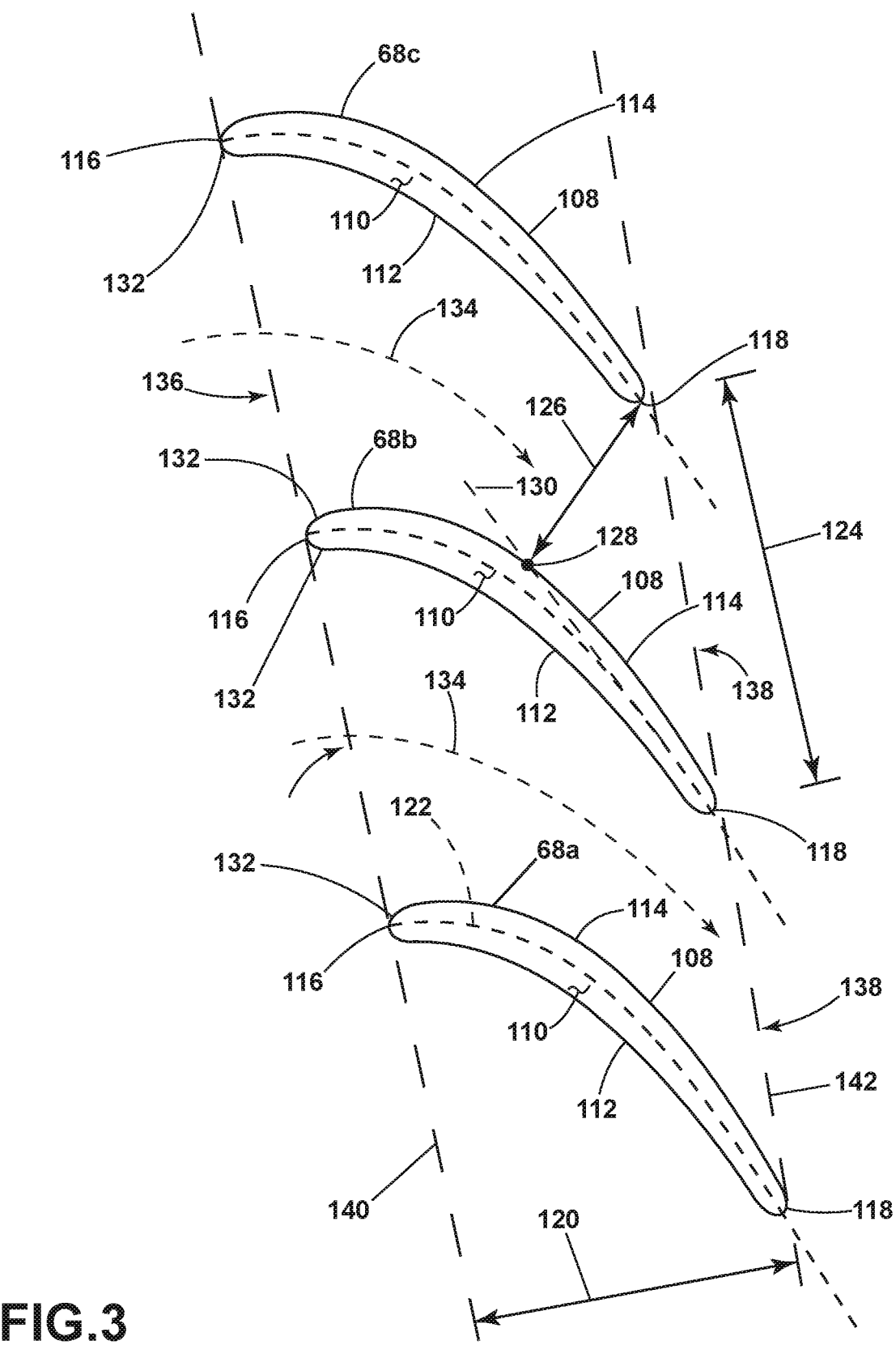
FIG. 3 is a schematic of three airfoils in a turbine assembly for the turbine engine of FIG. 2.

FIG. 3 is a top view of the blades 68 illustrated as a first, second, and third airfoil 68a, 68b, 68c. The tip shroud 98 has been removed for clarity. Each airfoil 68a, 68b, 68c has an outer wall 108 bounding an interior 110 extending in a circumferential direction between a pressure side 112 and a suction side 114. Each airfoil 68a, 68b, 68c extends in an axial direction between a leading edge 116 and a trailing edge 118 to define an axial chord 120. A camber line 122 extends down the center of each airfoil 68a, 68b, 68c.

A pitch length 124 and throat distance 126 are defined as specific lengths between consecutive airfoils 68a, 68b, 68c. The pitch length 124 as illustrated is the distance between consecutive trailing edges 118. The throat distance 126 is the distance from the trailing edge 118 of the third airfoil 68c to a point 128 on the second airfoil 68b where a tangent line 130 to the camber line 122 at the trailing edge 118 intersects with the suction side 114.

A pair of blades 132 define a stream-wise direction 134 of the hot gas path 106 which extends from an inlet 136 to an outlet 138. Axially spaced first and second planes 140, 142 perpendicular to the centerline 12 further define the inlet 136 and the outlet 138 respectively. The first plane 140 is spaced −3% to 5% of the axial chord 120 from the leading edge 116 and the second plane 142 is spaced 0 to 15% of the axial chord 120 from the trailing edge 118.

Figure 4:
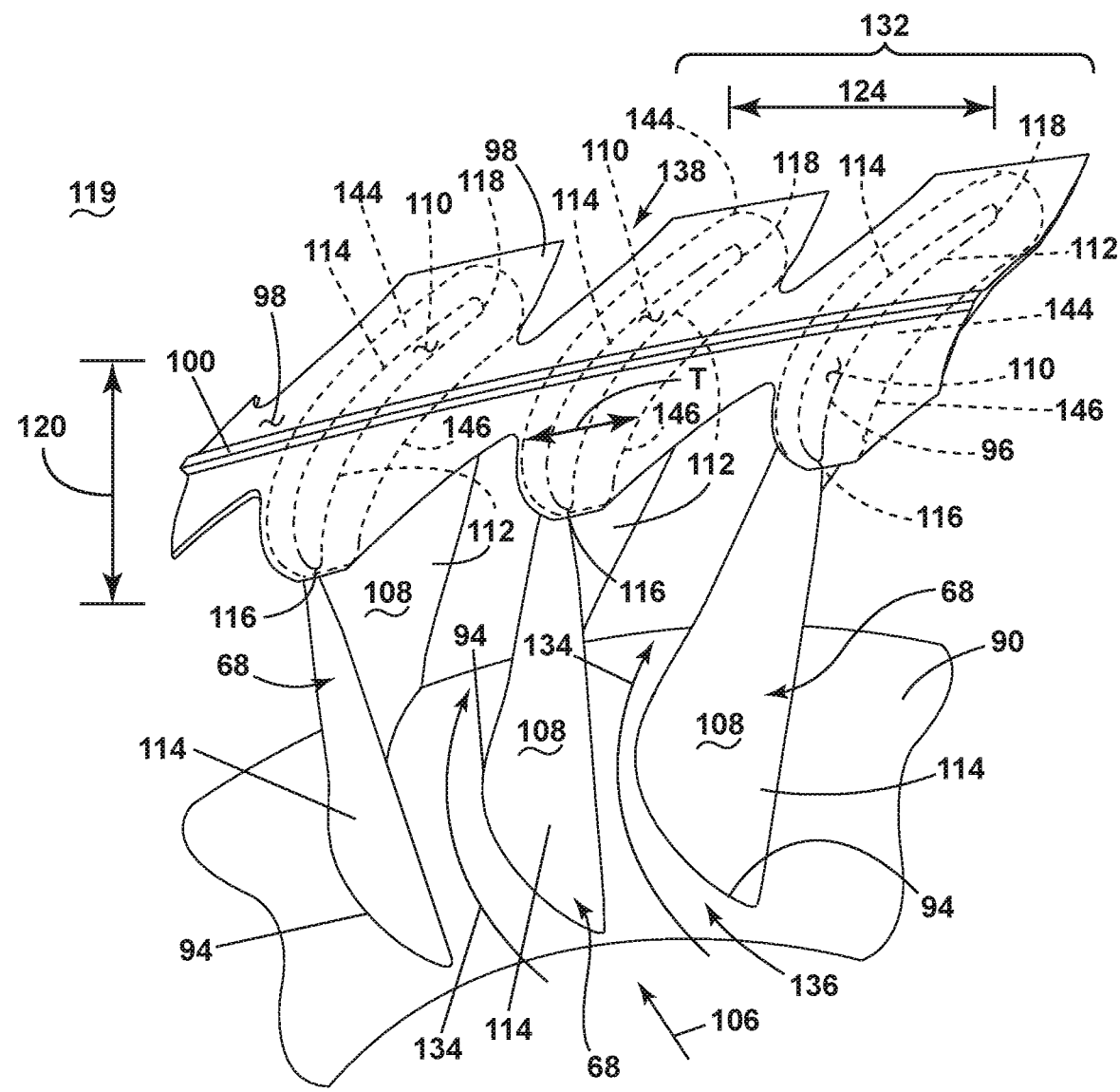
FIG. 4 is perspective view of a turbine assembly for the turbine engine of FIG. 2 and showing a tip shroud according to one embodiment.

Turning to FIG. 4 a perspective view of a turbine assembly 119 including the blades 68 with the tip shroud 98 is illustrated. A fillet 144 extends between the outer wall 108 and the tip shroud 98. The fillet 144 extends around the entire blade 68 at the tip 96. A fillet boundary 146, illustrated in phantom, defines where the fillet 144 meets the tip shroud 98. A maximum thickness T is defined from the fillet boundary 146 on the pressure side 112 to the fillet boundary 146 on the suction side 114. While a fillet 144 is illustrated, it should be understood that a fillet is not required and that the fillet boundary 146 as described herein can be any boundary circumscribing the blade.

Figure 5:
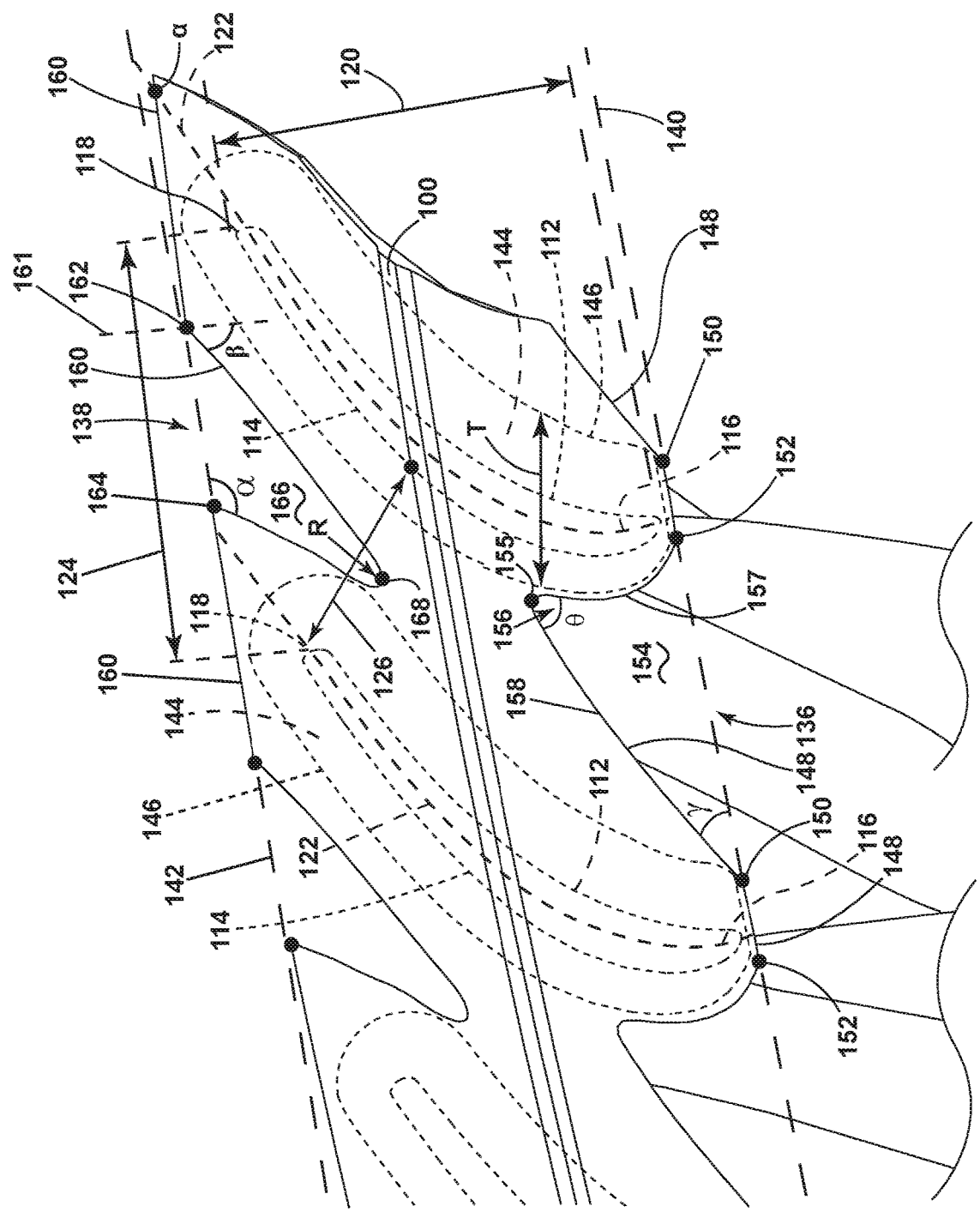
FIG. 5 is an enlarged view of a tip shroud for the turbine assembly of FIG. 4.

FIG. 5 is an enlarged portion of FIG. 4, for clarity, some parts illustrated in both FIG. 4 and FIG. 5 have remained unnumbered in FIG. 5 to aid in the description of the geometry of the tip shroud 98. A forward edge 148 of the tip shroud 98 comprises the entire edge of the tip shroud 98 forward of the seal rail 100. The first plane 140 at the inlet 136 intersects the forward edge 148 at the fillet boundary 146 proximate the leading edge 116 of the blade 68. The first plane 140 and the forward edge 148 overlap between a first forward point 150 and a second forward point 152 where the first forward point 150 is circumferentially spaced from the leading edge 116 on the pressure side 112 and the second forward point 152 is circumferentially spaced from the leading edge 116 on the suction side 114.

A scallop line 158 defining a portion of the forward edge 148 is circumferentially spaced from the pressure side 112 of the second airfoil 68b. The scallop line 158 extends from the first forward point 150 towards the suction side 114 of the second airfoil 68b. The scallop line 158 forms an angle γ between 25 and 60 degrees with the plane 140. While the scallop line 158 can be a straight line, it is also contemplated that the scallop line 158 can have a radius of curvature greater than 10% of the pitch length.

A fillet line 157 further defining a portion of the forward edge 148 begins at the second forward point 152 and runs circumferentially spaced from the suction side 114 of the first airfoil 68a. The fillet line 157 is along the fillet boundary 146 and as illustrated by way of non-limiting example can be parallel to the camber line 122. It should be understood that the fillet line need not be parallel to the camber line 122.

A rounded corner 156 of the forward edge 148 is located at a point 155 circumferentially spaced from the suction side 114 at 0 to 15% of the maximum thickness T of the fillet boundary 146. The rounded corner 156 has a radius of curvature of between 0 and 10% of the pitch length 124. The rounded corner 156 comprises an angle Θ between 20 and 70 degrees. The angle Θ extends between the fillet line 157 and the scallop line 158.

A first scalloped portion 154 is defined by the forward edge 148 from the first forward point 150 along the scallop line 158 to the rounded corner 156 and along the fillet line 157 to the second forward point 152.

An aft edge 160 of the tip shroud 98 comprises the entire edge of the tip shroud 98 aft the seal rail 100. An extension of the camber line 122 of the first airfoil 68a intersects the aft edge 160 at an intersection point a. A first aft point 162 is spaced 10 to 55% of the pitch length 124 from intersection point a along aft edge 160 on the second plane 142. An angle β between 45 and 80 degrees is formed between an axial line 161 and the aft edge 160 at the first aft point 162.

A second aft point 164 is spaced 35 to 65% of the pitch length 124 from the first aft point 162 toward the second airfoil 68b along plane 142. An angle α between 75 and 135 degrees is formed between the plane 142 and the aft edge 160 at the second aft point 164.

An aft rounded corner 168 with a radius of curvature R that is less than 25% of the throat distance 126 is located along the stream wise direction 134. The aft rounded corner 168 can be −15% to 10% of the pitch length 124 from the throat distance line 126.

A second scalloped portion 166 is defined by the aft edge 160 spanning from the first aft point 162 to the aft rounded corner 168 and to the second aft point 164. The second scalloped portion 166 begins and ends at the first and second aft points 162 and 164 spaced from the fillet boundary 146 near the trailing edge 118. The first scalloped portion, however, begins and ends at the first and second forward points 150, 152 along the fillet boundary 146.

Figure 6:
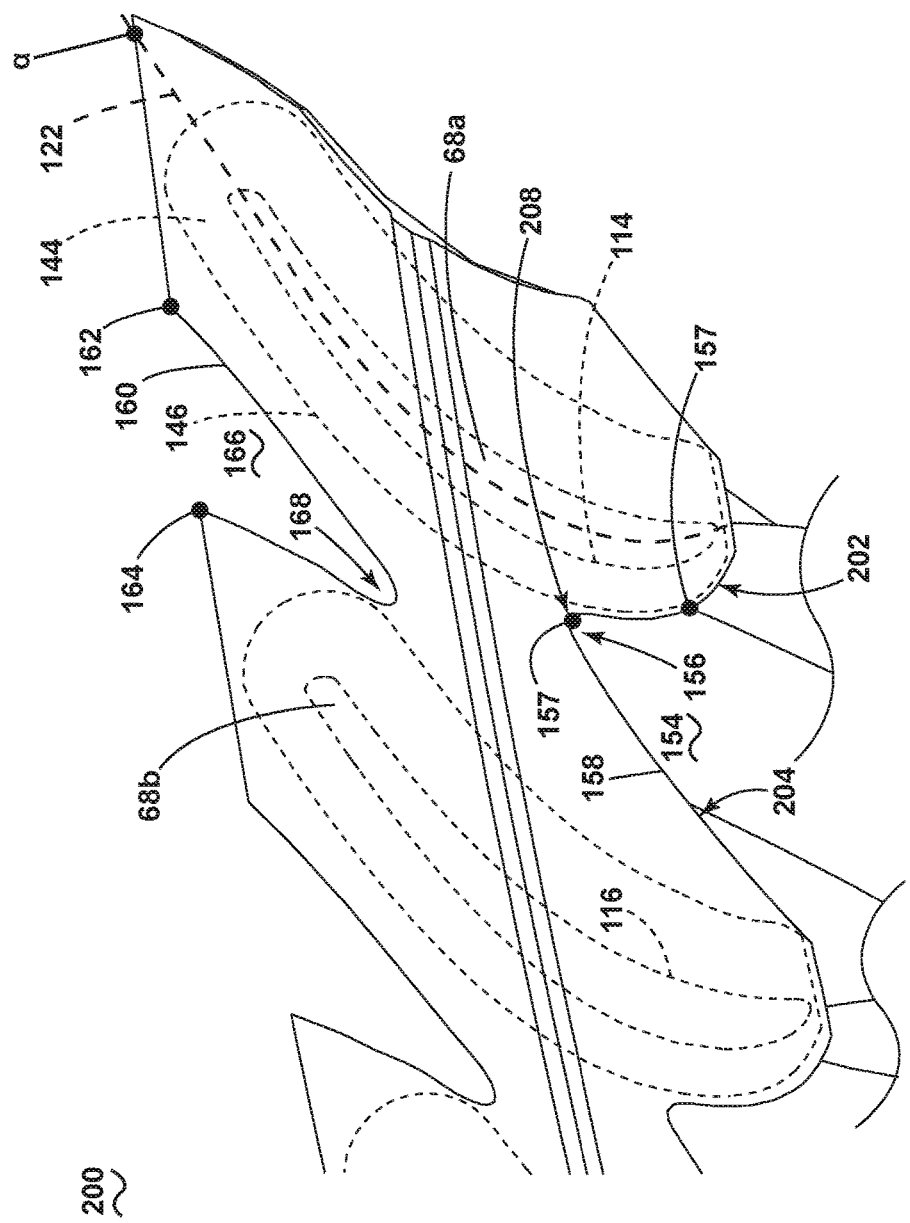
FIG. 6 is the enlarged view of FIG. 5 for describing a method of shaping the turbine assembly of FIG. 5.

Turning to FIG. 6 a method 200 of shaping the tip shroud 98 as described herein is illustrated with steps including at 202 forming the fillet line 157 such that it is circumferentially spaced from the suction side 114 of the first airfoil 68a parallel to the camber line 122 as close to the fillet boundary 146 as possible. Then at 204 forming the scallop line 158 spaced from the pressure side 112 of the second airfoil 68b and extending towards the suction side 114 of the first airfoil 68a. At 206 connecting the fillet line 157 to the scallop line 158 with a rounded corner 156 at the point 155 to define the first scalloped portion 154.

The method 200 can further include measuring a distance from intersection point a that is 10 to 55% of the pitch length 124 to the first aft point 162. Then measuring a distance of 35 to 65% of the pitch length 124 to the second aft point 164. Forming the aft rounded corner 168 with the radius of curvature R near the throat distance line 126 as described herein. Connecting the first aft point 162 to the aft rounded corner 168 and finally to the second aft point 164 defining the aft edge 160 to form the second scalloped portion 166.

It is further contemplated that the forming as described herein can include removing material from an existing tip shroud to define the first and second scalloped portion. Removal of the material can include by way of non-limiting example laser cutting.

It is also contemplated that shaping the tip shroud as described herein can be formed with additive manufacturing where the first and second scalloped portions are part of a computer aid drafting program and printed accordingly.

Benefits to shaping a tip shroud as described herein include weight reduction while maintaining aerodynamic efficiency. The scalloping reduces the weight by at least 15% while maintaining aerodynamic efficiency. Additionally the mixing losses and secondary losses in the engine turbines are minimally affected. By maintaining the same aerodynamic efficiency and reducing weight, the specific fuel consumption will improve.

Technical benefits include a reduction in centrifugal loads on blades at high rotational speeds while imposing no additional aerodynamic penalty compared to an unscalloped shroud.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   at least one pair of airfoils comprising a first and second airfoil each having an outer wall bounding an interior extending between a pressure side and a suction side to define a circumferential direction and extending between a leading edge and a trailing edge to define an axial direction and extending between a root and a tip to define a radial direction, the first and second airfoils are circumferentially spaced to define an inlet between the leading edges and an outlet between the trailing edges;
   a tip shroud circumscribing the pair of airfoils operably coupled to the tip extending in the axial direction between axially spaced first and second planes; and
   a first scalloped portion comprising a fillet line circumferentially spaced from the suction side of the first airfoil connecting a first forward point in the first plane to a rounded corner defining an acute angle, and a scallop line connecting the rounded corner to a second forward point in the first plane, the second forward point circumferentially spaced from the leading edge on the pressure side of the second airfoil.

2. The turbine engine as claimed in claim 1 where the first scalloped portion defines at least a portion of a forward edge of the tip shroud.

3. The turbine engine as claimed in claim 1 including at least one seal rail extending circumferentially along an outer surface of the tip shroud.

4. The turbine engine as claimed in claim 3 where the first airfoil defines an axial chord measured from the leading edge to the trailing edge and where the rounded corner is axially spaced 0 to 30% of the axial chord from the seal rail and the first forward point is axially spaced −3% to 5% of the axial chord from the leading edge of the first airfoil.

5. The turbine engine as claimed in claim 1 where the fillet line and the scallop line meet at a rounded corner circumferentially spaced from the suction side fillet boundary at less than 15% of a maximum thickness of the fillet boundary.

6. The turbine engine as claimed in claim 1 where the fillet line forms an angle between 20 and 70 degrees with the scallop line.

7. The turbine engine as claimed in claim 1 where the scallop line forms an angle between 25 and 60 degrees from the first plane.

8. The turbine engine as claimed in claim 1 where the first airfoil defines an axial chord measured from the leading edge to the trailing edge and the second plane is axially positioned 0 to 15% of the axial chord from the trailing edge of the first airfoil.

9. The turbine engine as claimed in claim 1 including a pitch length defined as a distance from the trailing edge of the first airfoil to the trailing edge of the second airfoil.

10. The turbine engine as claimed in claim 9 where the rounded corner has a radius of curvature that is 0 to 10% of the pitch length or the scallop line has a radius of curvature greater than 10% of the pitch length.

11. The turbine engine as claimed in claim 9 comprising a second scalloped portion having a width extending from a first aft point in the second plane to a second aft point in the second plane that is 35 to 65% of the pitch length at the outlet.

12. The turbine engine as claimed in claim 11 where the second scalloped portion defines at least a portion of an aft edge where the aft edge includes an aft rounded corner located between the first and second airfoil defining a radius.

13. The turbine engine as claimed in claim 12 further including a throat distance line extending from the first airfoil to the trailing edge of the second airfoil such that the throat distance line is locally perpendicular to the suction side of the first airfoil defining a throat distance and a stream-wise direction running substantially perpendicular to the throat distance line from the inlet to the outlet where the aft rounded corner is positioned at −15% to 10% of the pitch length along the stream-wise direction from the throat distance line.

14. A turbine assembly for a turbine engine comprising:
   a hub defining a circumferential surface and rotatable about a centerline;

at least one pair of blades provided circumferentially about the hub, each blade having a wall bounding an interior and defining a pressure side and a suction side, extending chord-wise from a leading edge to a trailing edge, and radially from a root to a tip, with the root mounted to the circumferential surface; and a tip shroud provided circumferentially about the tip;

a fillet extending between the wall and the tip shroud; and a forward edge of the tip shroud at least partially defined by a fillet line on a fillet boundary on the suction side and an edge extending along a line from the fillet on the pressure side that intersects with the fillet boundary, and a scallop line forms an angle between 25 and 60 degrees with respect to a plane perpendicular to the centerline;

wherein the fillet line and the scallop line meet at a rounded corner defining an acute angle.

15. The turbine assembly as claimed in claim 14 where the rounded corner is circumferentially spaced from the suction side fillet boundary at less than 15% of a maximum thickness of the fillet boundary.

16. The turbine assembly as claimed in claim 14 where the fillet line forms an angle between 20 and 70 degrees with the scallop line.

17. The turbine assembly as claimed in claim 14 where each blade defines an axial chord measured from the leading edge to the trailing edge and a second plane is axially positioned 0 to 15% of the axial chord from the trailing edge of each blade.

18. The turbine assembly as claimed in claim 17 comprising a pitch length defined as a distance between the trailing edges of an adjacent pair of blades.

19. The turbine assembly as claimed in claim 18 comprising an aft edge of the tip shroud at least partially defined as an edge extending from a first aft point through an aft rounded corner axially spaced from the first aft point to a second aft point that is 35 to 65% of the pitch length circumferentially spaced from the first aft point.

20. The turbine assembly as claimed in claim 19 where the aft edge makes an angle between 75 and 135 degrees with the second plane or the first aft point is circumferentially spaced 10 to 55% of the pitch length from an intersection point of the aft edge with a camber line of the blade.

21. A method of shaping a tip shroud with a forward edge and an aft edge and mounted to a first and second airfoil where each airfoil includes a leading edge and a trailing edge, and a circumferential distance between consecutive trailing edges defines a pitch length and a throat distance line extends from the first airfoil to a trailing edge of the second airfoil defining a throat distance, the method comprising:

forming a fillet line circumferentially spaced from a suction side of the first airfoil;

forming a scallop line circumferentially spaced from a pressure side of the second airfoil and extending towards the suction side of the first airfoil; and connecting the fillet line to the scallop line with a rounded corner defining an acute angle and having a radius of curvature that is 0 to 10% of the pitch length at a point circumferentially spaced from the first airfoil at less than 15% of a maximum thickness of a fillet boundary circumscribing the airfoil.

22. The method of shaping a tip shroud as claimed in claim 21 comprising measuring a distance from an intersection point where an extension of the camber line of the first airfoil intersects the second plane to a first aft point on the second plane circumferentially spaced from the intersection point that is 10 to 55% of the pitch length from the intersection point, measuring a distance from the first aft point that is 35 to 65% of the pitch length to a second aft point, forming an aft rounded corner with a radius of curvature that is less than 25% of the throat distance and −15% to 10% of the pitch length from the throat distance line, and connecting the first aft point to the aft rounded corner and finally to the second aft point to form a second scalloped portion.

23. The method of shaping a tip shroud as claimed in claim 21 where forming includes removing material from the tip shroud.

\* \* \* \* \*